(No Model.)
T. CLEMENTS.
AXLE BOX.
No. 458,146. Patented Aug. 18, 1891.
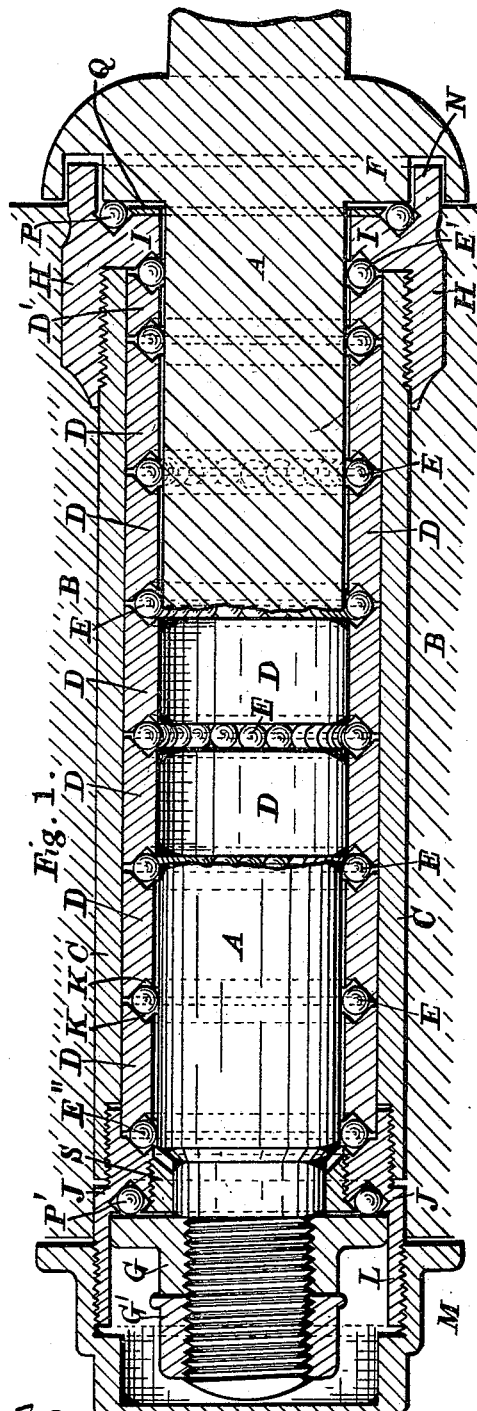
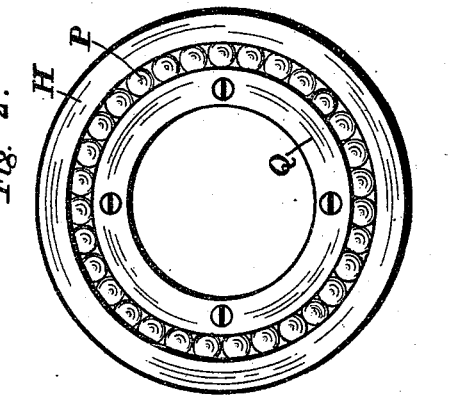
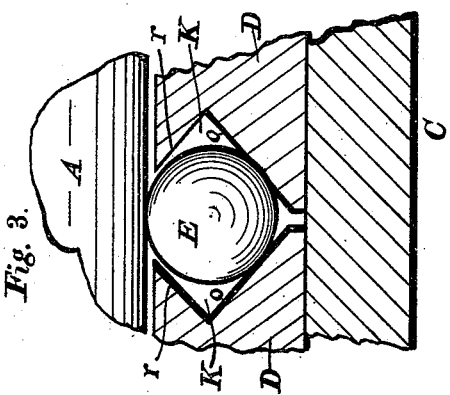
Witnesses:
William Ollis.
E. G. Crannell.
Inventor:
Thomas Clements:
By Geo. B. Selden,
atty.

UNITED STATES PATENT OFFICE.

THOMAS CLEMENTS, OF ROCHESTER, NEW YORK, ASSIGNOR TO THE JAMES CUNNINGHAM SON & COMPANY, OF SAME PLACE.

AXLE-BOX.

SPECIFICATION forming part of Letters Patent No. 458,146, dated August 18, 1891.

Application filed August 6, 1890. Serial No. 361,150. (No model.)

*To all whom it may concern:*

Be it known that I, THOMAS CLEMENTS, a citizen of the United States, residing at Rochester, in the county of Monroe, in the State of New York, have invented certain Improvements in Axle-Boxes, of which the following is a specification, reference being had to the accompanying drawings.

My present invention relates to certain improvements in axle-boxes for carriages or other vehicles of that type in which hardened balls are used to reduce the friction.

My improvements consist in an improved construction of the sleeve of the axle-box, whereby provision is made for taking up wear by means of the adjustment by a screw-collar of a series of annularly-grooved rings, which inclose the balls and retain them in place when the wheel is removed from the axle.

My invention is fully described and illustrated in the following specification and the accompanying drawings, and the novel features thereof specified in the claims annexed to the said specification.

My improvements in axle-boxes are represented in the accompanying drawings, in which—

Figure 1 is a central longitudinal section through an axle-box embodying my invention, showing the axle also partially in section. Fig. 2 represents the inner end of the axle-box. Fig. 3 is a partial longitudinal section on an enlarged scale, showing one of the balls in elevation.

In the accompanying drawings representing my improvements in axle-boxes, A is the axle; B, the hub; C, the sleeve; D D, the annularly-grooved rings or sections, and E the anti-friction balls. The axle is of any ordinary or preferred style, provided at the inner end of the hub with a collar F and on the outer end with the nut G or nuts G G', by which the wheel is held on the axle. The sleeve is firmly inserted in the hub by hydraulic pressure or other suitable means. At one end, preferably the inner, the sleeve is provided with a screw-cap H, which projects inward, so as to almost touch the axle, as represented at I, Fig. 1. At its other end the sleeve is provided with a screw-collar J, which by its adjustment in the sleeve causes all the balls to bear equally on the axle. This result is accomplished by providing each of the series of rings with the annular V-shaped grooves K, (see Fig. 3,) within which the rows of balls E are located, the arrangement being such that when the rings D are forced together by the screw-cap J the inclined surfaces of the grooves crowd the balls inward into contact with the axle. The rings D are made true on their outer surface and fit the cylindrical opening in the sleeve C, but so that they can be shifted lengthwise in the sleeve by force exerted by turning the screw-cap J. At the inner end a short ring D' may be used to bring the circular rows of balls closer together at the point of greatest wear. The row of balls E' at the inner end of the sleeve is fitted into a V-groove in the inwardly-projecting portion I of the screw-cap H. At the outer end the row of balls E" is located in a V-groove in the inner end of the screw-collar J. As indicated in Fig. 3, the V-grooves in which the balls are located are so shaped that the balls bear on the outer surfaces of the grooves $o$ $o$, Fig. 3, while the inner surfaces $r$ $r$ are placed at some little distance from the balls, so as to permit the balls to be forced inward against the axle when the rings D D are moved toward each other by screwing the collar J farther into the sleeve. As the collar J projects beyond the end of the hub, this adjustment may be made without removing the sleeve from the hub, the projecting portion I, Fig. 1, of the hub being provided with notches or openings for the application of a suitable wrench, or a wrench may be applied to the cap-nut M, which may be screwed onto the projecting flange of the collar J to exclude sand or dust. By screwing the screw-collar J into the sleeve any wear in the balls or grooves or on the surface of the axle may be taken up, the rings D D being thus forced slightly closer together and the outer inclined surfaces $o$ $o$ of the V-grooves K forcing the balls inward into contact with the axle. The balls and the surfaces on which they bear are preferably hardened, being ground true after the hardening, if necessary. It will be observed that all the balls in all the rows will be pressed with equal force against the surface of the axle, thus securing the most perfect fit of the wheel on its journal.

The inwardly-projecting flange I may be formed in one piece with the sleeve or it may be inserted therein in any suitable manner, the cap H being dispensed with. I prefer, however, to use the cap and provide it with the rim N, Fig. 1, which projects into an annular groove in the collar F on the axle, for the purpose of excluding dust or dirt from the axle-box. The groove for the balls in the flange I may also be dispensed with, the ring D' bearing directly against the flange. In a similar manner the row of balls E'' between the screw-collar J and the ring D may be omitted. I also apply friction-balls on the ends of the box, as represented at P P', which may be held in place by the circular plate Q, Fig. 2, or by the screw-collar S, Fig. 1.

I do not claim herein anything shown or described in my application No. 344,434, filed March 18, 1890.

I am aware that shafts have been provided with loose rings having lateral grooves and balls in said grooves to resist the lengthwise thrust of said shafts, and I do not claim, broadly, the combination of a shaft with rings and balls. It is characteristic of my improvement that the balls are in contact with the shaft, and that they are adapted to be held in actual contact with the shaft and crowded upon it by forcing the rings toward each other, said rings having bearings behind the balls for that purpose.

I claim—

1. The combination, with the axle of a vehicle-wheel, of a sleeve inserted in the hub of the wheel, a series of grooved rings in the sleeve, a series of rows of anti-friction balls located in the grooves in the rings and arranged to bear against the axle, the grooves in said rings having a bearing-face behind the balls, and suitable means adapted to close the spaces between the rings, whereby the balls are forced into contact with the axle, substantially as described.

2. The combination, with the axle A, of the hub B, sleeve C, provided at one end with an inwardly-projecting flange I and at the other with the screw-collar J, and a series of grooved rings D D, located in the sleeve and having circular rows of anti-friction balls arranged to bear on the axle inserted in the grooves between the adjacent ends of the rings, said grooves having bearing-faces behind the balls adapted to crowd them upon the axle when the spaces between the rings are diminished, substantially as described.

3. The combination, with the axle A, of the hub B, sleeve C, provided at one end with the cap H, having inwardly-projecting flange I, and at the other with the screw-collar J, and a series of grooved rings D D, located in the sleeve and having circular rows of anti-friction balls arranged to bear on the axle inserted in the grooves between the adjacent ends of the rings, said grooves having bearing-faces behind the balls adapted to crowd them upon the axle when the spaces between the rings are dimished, substantially as described.

4. The combination, with the axle A, of the hub B, sleeve C, provided at one end with an inwardly-projecting flange I and at the other with the screw-collar J, having flange L, whereby the collar may be adjusted in the sleeve, and a series of grooved rings D D, located in the sleeve and having circular rows of anti-friction balls arranged to bear on the axle inserted in the grooves between the adjacent ends of the rings, said grooves having bearing-faces behind the balls adapted to crowd them upon the axle when the spaces between the rings are diminished, substantially as described.

THOMAS CLEMENTS.

Witnesses:
 GEO. B. SELDEN,
 JOHN CONNELL.